United States Patent
Gace et al.

(10) Patent No.: US 10,231,443 B2
(45) Date of Patent: Mar. 19, 2019

(54) AQUACULTURE FISH PEN WITH MORTALITY TRAP

(71) Applicant: InnovaSea Systems, Inc., Bainbridge Island, WA (US)

(72) Inventors: Langley R. Gace, Bainbridge Island, WA (US); David Kelly, Bainbridge Island, WA (US)

(73) Assignee: InnovaSea Systems, Inc., Bainbridge Island, WA (US)

( * ) Notice: Subject to any disclaimer, the term of this patent is extended or adjusted under 35 U.S.C. 154(b) by 207 days.

(21) Appl. No.: 15/441,014

(22) Filed: Feb. 23, 2017

(65) Prior Publication Data

US 2017/0238511 A1 Aug. 24, 2017

Related U.S. Application Data

(60) Provisional application No. 62/298,964, filed on Feb. 23, 2016.

(51) Int. Cl.
*A01K 61/90* (2017.01)
*A01K 61/60* (2017.01)
(Continued)

(52) U.S. Cl.
CPC .............. *A01K 61/60* (2017.01); *A01K 61/10* (2017.01); *A01K 61/65* (2017.01); *A01K 61/95* (2017.01); *Y02A 40/826* (2018.01)

(58) Field of Classification Search
CPC ........ A01K 61/60; A01K 61/90; A01K 61/95; A01K 61/10
See application file for complete search history.

(56) References Cited

U.S. PATENT DOCUMENTS

| 85,126 A | 12/1868 | Pitt |
| 203,399 A | 5/1878 | Wyckoff |

(Continued)

FOREIGN PATENT DOCUMENTS

| FR | 2 596 613 A1 | 10/1987 |
| JP | 62-172358 U | 10/1987 |

(Continued)

OTHER PUBLICATIONS

European Supplemental Search Report and Written Opinion dated Apr. 24, 2014, issued in corresponding European Application No. 11853125.0, filed Dec. 28, 2011, 7 pages.

(Continued)

*Primary Examiner* — Kristen C Hayes
(74) *Attorney, Agent, or Firm* — Christensen O'Connor Johnson Kindness, PLLC; Ryan E. Dodge, Jr.

(57) ABSTRACT

A mortality trap (150) for a spar buoy fish pen (100) is configured to receive and trap deceased fish, or morts (M), that sink from the fish pen. The mortality trap attaches to a lower portion of the spar buoy (110) to define a first passage (90). The sinking mort passes into an upper receiver portion (150U) of the mortality trap, and encounters a sloping transverse panel (154). Gravity causes the mort to continue through a second passage (B) into a lower entrapment portion (150L), and further into a region underlying the transverse panel (154) preventing the mort from escaping if it becomes positively buoyant. The entrapment portion optionally includes a converging channel into a valved port, to permit extraction of morts. The mortality trap may be located on the distal end of the spar buoy, or at an intermediate location on the lower portion of the spar buoy.

20 Claims, 7 Drawing Sheets

(51) Int. Cl.
*A01K 61/95* (2017.01)
*A01K 61/10* (2017.01)
*A01K 61/65* (2017.01)

(56) References Cited

U.S. PATENT DOCUMENTS

| | | | |
|---|---|---|---|
| 215,031 A | 5/1879 | Webb | |
| 1,485,875 A | 3/1924 | O'Malley | |
| 1,614,600 A | 1/1927 | Cleaver | |
| 2,606,350 A | 8/1952 | French | |
| 3,691,994 A | 9/1972 | McPherson | |
| 3,702,709 A | 11/1972 | Shaffer | |
| 3,992,737 A | 11/1976 | Duel | |
| 4,147,130 A | 4/1979 | Goguel | |
| 4,252,081 A | 2/1981 | Smith | |
| 4,312,296 A | 1/1982 | Stelleman | |
| 4,337,553 A | 7/1982 | Fischer | |
| 4,380,213 A | 4/1983 | Blair | |
| 4,615,301 A | 10/1986 | Maekawa | |
| 4,747,369 A | 5/1988 | Götmalm | |
| 5,172,649 A | 12/1992 | Bourgeois | |
| 5,193,481 A | 3/1993 | Loverich | |
| 5,359,962 A | 11/1994 | Loverich | |
| 5,517,936 A | 5/1996 | Mennucci et al. | |
| 5,617,813 A | 4/1997 | Loverich et al. | |
| 6,044,798 A | 4/2000 | Foster | |
| 6,117,313 A | 9/2000 | Goldman et al. | |
| 6,892,672 B2 | 5/2005 | Klein | |
| 6,932,025 B2 * | 8/2005 | Massingill | A01K 63/04 119/216 |
| 7,284,501 B2 * | 10/2007 | Page | A01K 61/90 119/223 |
| 7,650,856 B2 | 1/2010 | Quinta Cortiñas | |
| 7,681,528 B2 | 3/2010 | Ytterland | |
| 8,028,660 B2 | 10/2011 | Troy | |
| 8,683,955 B2 | 4/2014 | Madsen et al. | |
| 9,072,282 B2 | 7/2015 | Madsen et al. | |
| 2006/0096548 A1 | 5/2006 | Ytterland | |
| 2006/0102087 A1 * | 5/2006 | Page | A01K 61/90 119/223 |
| 2006/0162667 A1 * | 7/2006 | Papadoyianis | A01K 61/60 119/223 |
| 2007/0169711 A1 | 7/2007 | Sims | |
| 2008/0110408 A1 | 5/2008 | Thorvardson | |
| 2012/0167829 A1 | 7/2012 | Madsen et al. | |
| 2015/0359206 A1 * | 12/2015 | Naess | A01K 63/04 119/215 |

FOREIGN PATENT DOCUMENTS

| | | | |
|---|---|---|---|
| WO | 87/03170 A1 | 6/1987 | |
| WO | WO-2011133045 A1 * | 10/2011 | A01K 61/60 |
| WO | WO-2018111111 A1 * | 6/2018 | A01K 61/95 |

OTHER PUBLICATIONS

International Search Report and Written Opinion dated Aug. 27, 2012, issued in corresponding International Application No. PCT/US2011/067610, filed Dec. 28, 2011, 7 pages.

International Search Report and Written Opinion dated May 15, 2017, issued in corresponding International Application No. PCT/US2017/019101, filed Feb. 23, 2017, 5 pages.

* cited by examiner

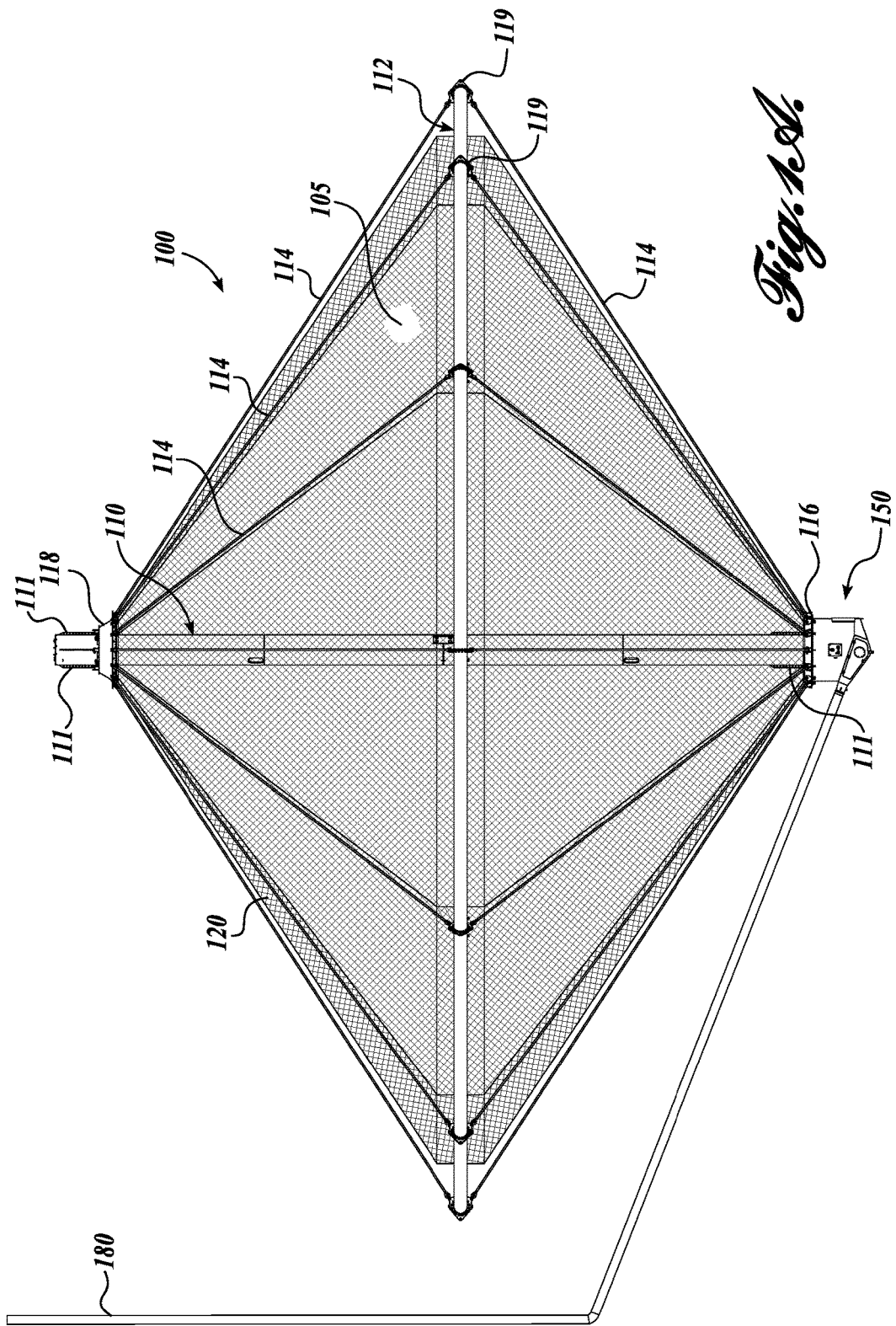

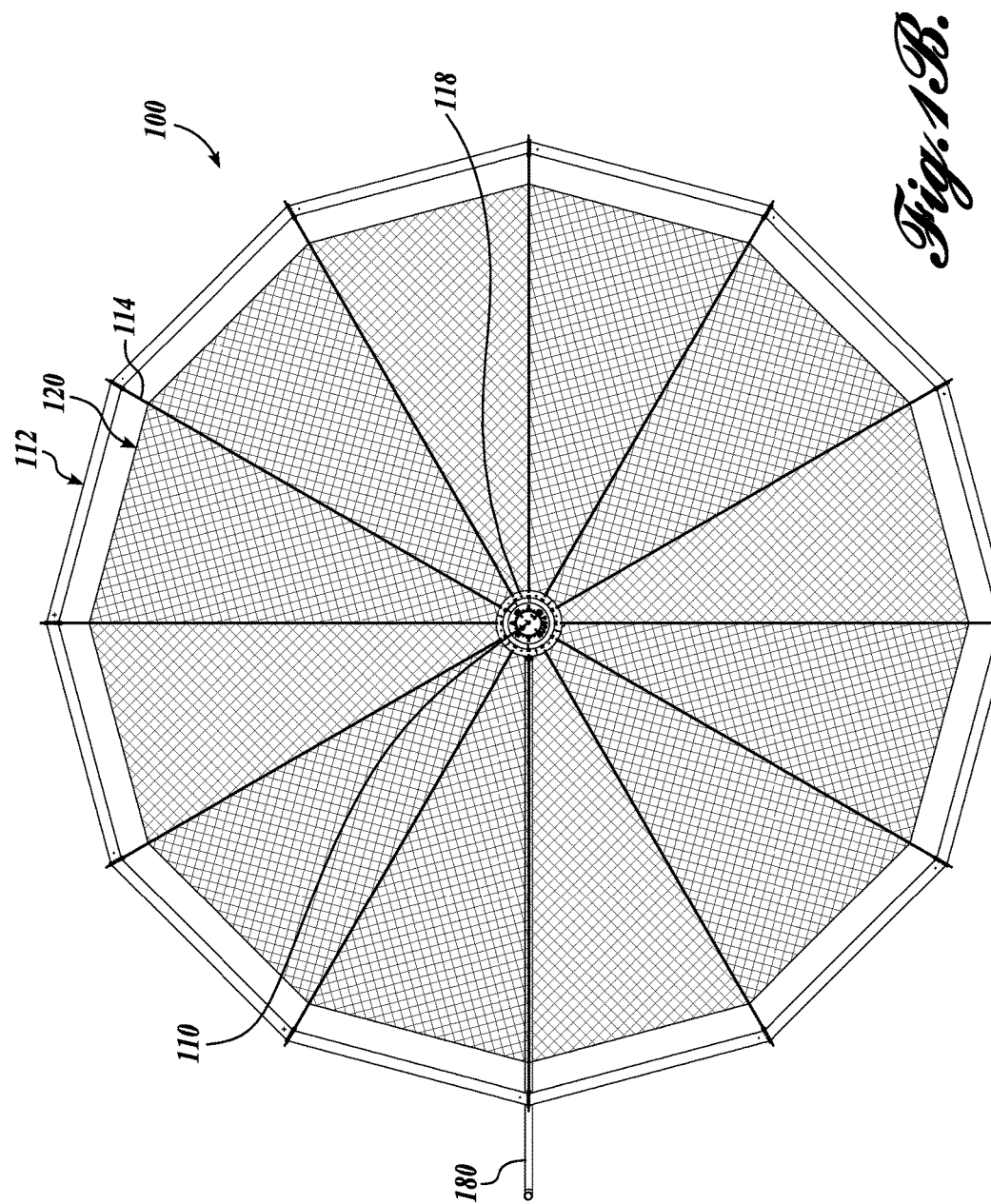

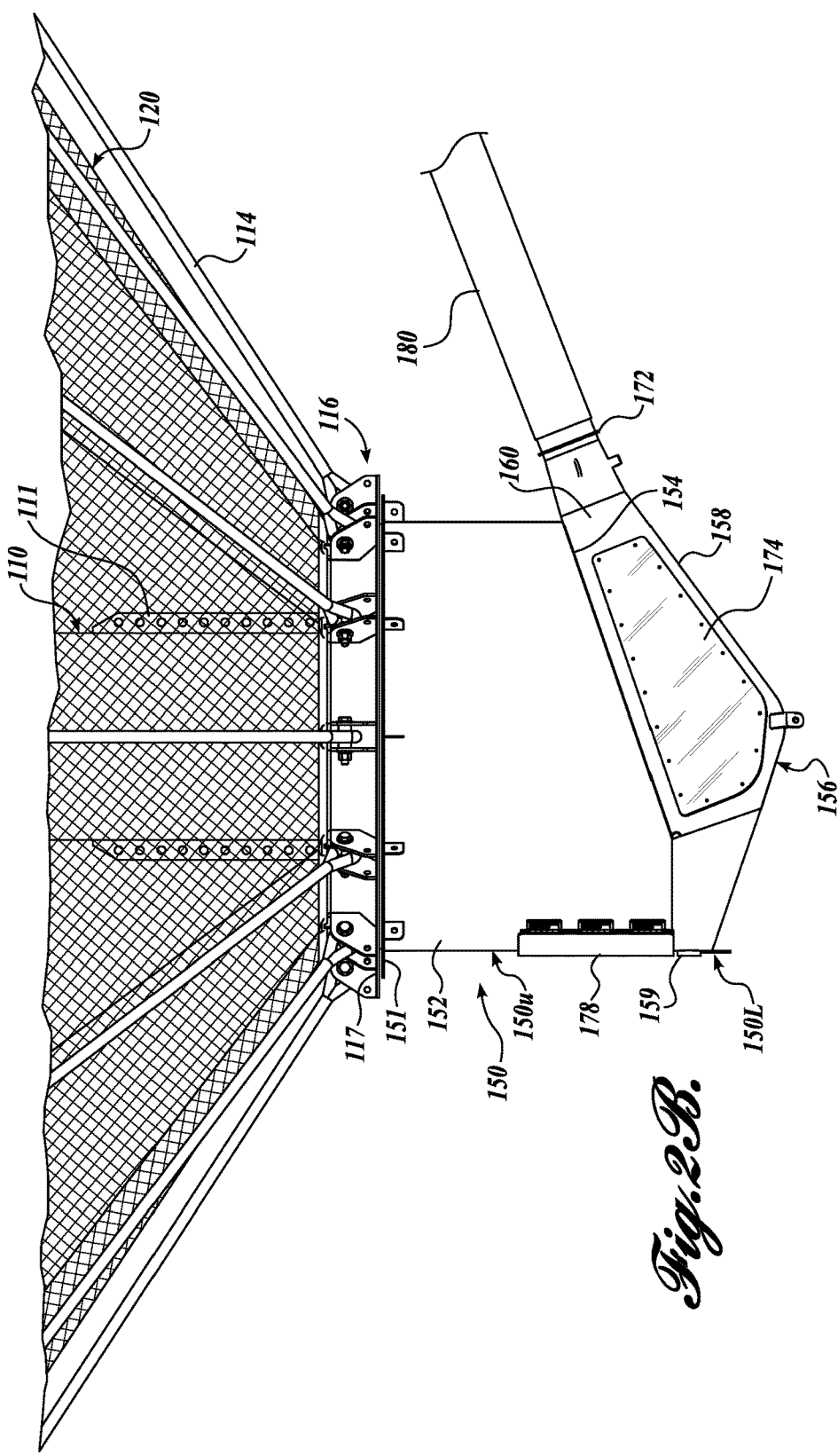

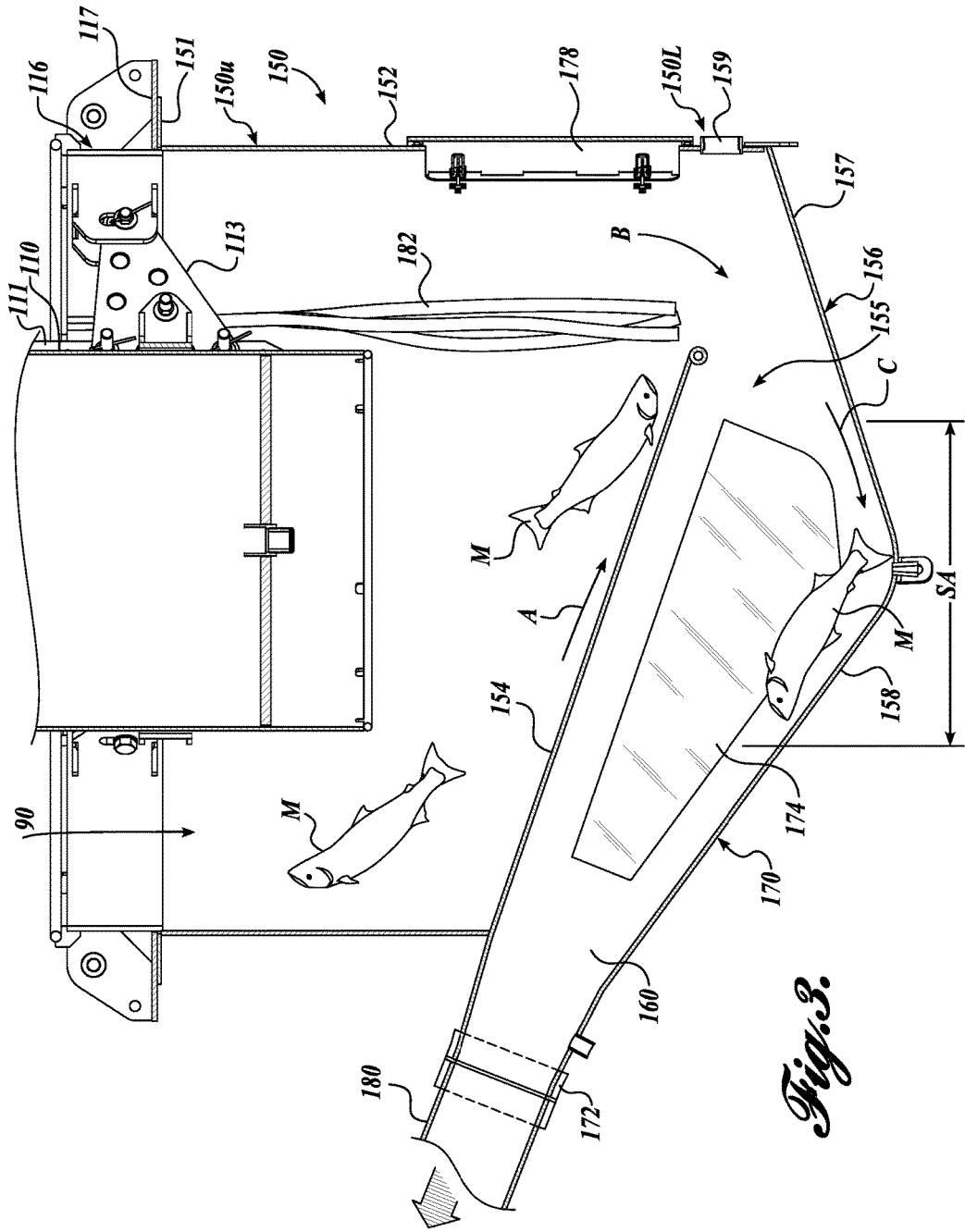

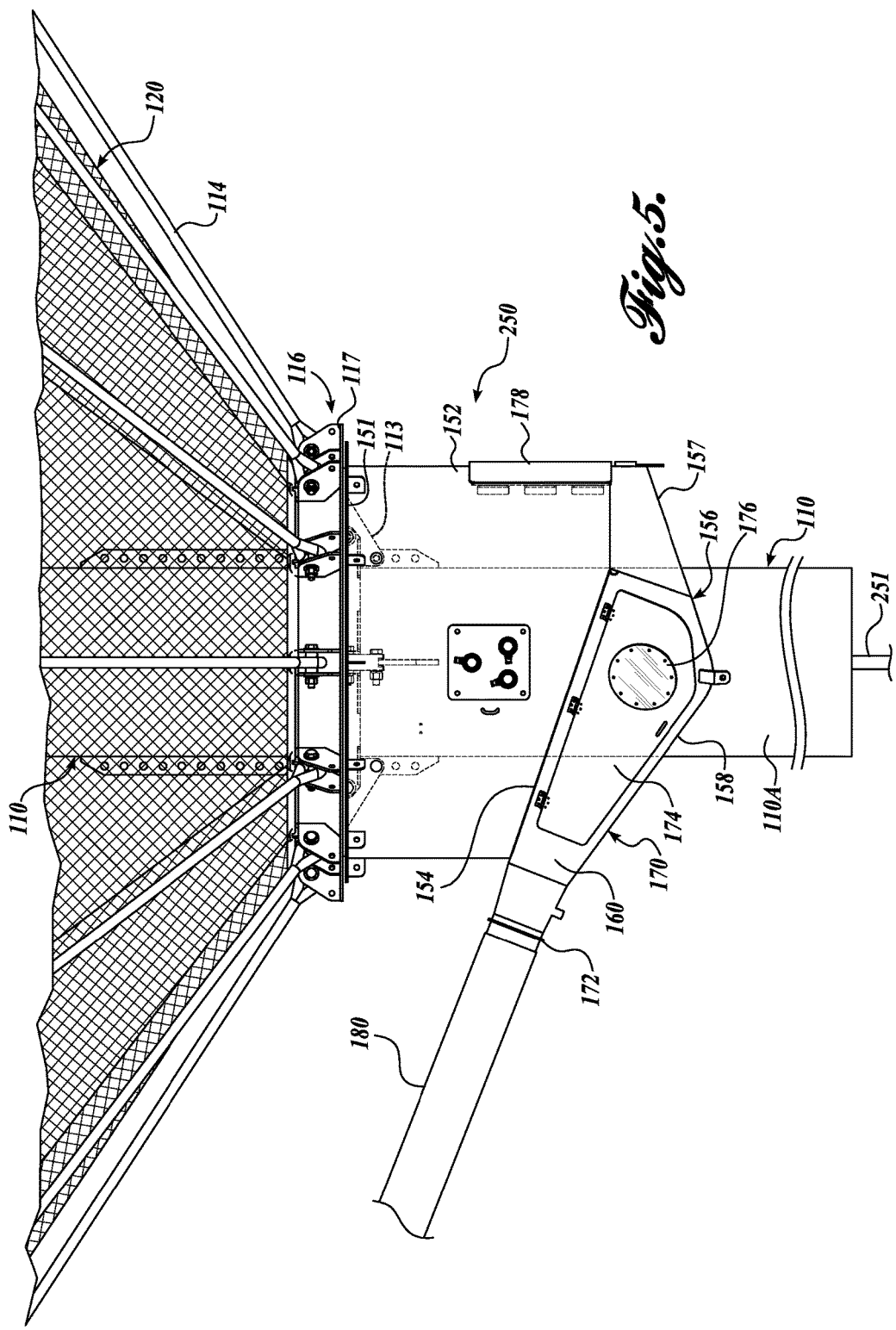

AQUACULTURE FISH PEN WITH MORTALITY TRAP

CROSS-REFERENCE TO RELATED APPLICATION

This application claims the benefit of Provisional Application No. 62/298,964, filed Feb. 23, 2016, which is hereby expressly incorporated by reference in its entirety herein.

BACKGROUND

For millennia, the seas and other natural water reservoirs have provided an abundant and stable supply of sustenance. In recent years, however, overfishing, inefficient harvesting practices, and environmental stressors have resulted in the depletion or decline of certain fish populations in many regions. At the same time, an increasing human population, increasing standards of living, and an increasing awareness of the health benefits of seafood have increased the demand for fish and fish product.

Advances in aquaculture in general and fish farming in particular, as well as improvements in technology, have enabled significant progress to be made to efficiently address increasing world demand for fish product at lower costs. Developments in fish farming also reduce the risks associated with overfishing indigenous fish populations. In particular, offshore aquaculture systems, also known as open-ocean aquaculture, employing fish cages or fish pens, have found some success. Large, submersible fish pens suitable for aquaculture applications are known in the art to aid in the efficient and bio-responsible cultivation of food sources. In open-ocean aquaculture large fish pens are positioned some distance offshore, in deeper and less-sheltered waters, where ocean currents are relatively strong. The fish pens are stocked with young fish or fry, and the fish are fed and maintained until they reach maturity. The fish pens provide a habitat and protection for the fish. Similar fish pens may also be used for freshwater aquaculture, for example, in larger freshwater bodies of water.

A disadvantage of inshore aquaculture systems is that waste products from a fish farm can settle below the fish cage and accumulate on the seafloor, with potential adverse effects to the ecosystem of the benthic zone. By providing systems configured to retain the farm fish in offshore locations, the waste products are more rapidly swept away from the site and diluted. Offshore systems, away from more heavily trafficked inshore locations, are more readily sited and expanded to meet the increasing demands.

More recent innovations in fish pens employing a center spar buoy or center cluster of spar buoys are disclosed in U.S. Pat. No. 5,359,962, to Loverich, and in U.S. Pat. No. 5,617,813, to Loverich et al., both of which are hereby incorporated by reference in their entireties. Loverich et al. discloses a mobile pen for growing fish or shellfish wherein a central vertical spar buoy is surrounded by one or more horizontal rim assemblies. A mesh/netting extends from an upper end portion of the spar buoy outward to the rim assemblies, and then inward from the rim assembly to a lower end portion of the spar buoy. U.S. Pat. No. 9,072,282, to Madsen et al., which is also hereby incorporated by reference, discloses a spar buoy fish pen assembly with a deployable system for segregating a population of fish within a fish pen, and/or for crowding the fish into a smaller space, for example to facilitate treatment or harvesting operations.

There remains a need for improvements in fish pen construction. For example, in contained fish pen populations it is desirable to remove or separate sick or deceased fish from the healthy population quickly, in order to prevent harm to the healthy fish. In current fish pens it is difficult to isolate and remove deceased fish ("morts") from the fish pen. It would be beneficial to isolate morts quickly, to maintain the health of the remaining population. It would also be beneficial to identify and remove morts quickly, to be able to determine the cause of death and, if appropriate, take corrective measures.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A fish pen includes a spar buoy and a mesh enclosure that defines an enclosed volume. The mesh enclosure is attached to an upper end portion and a lower end portion of the spar buoy. A mortality trap configured to receive and separate morts from the mesh enclosure, is attached to the lower end portion of the spar buoy, either to the distal end of the lower end portion or at an intermediate location along the lower end portion. The mortality trap includes a receiver portion that engages the bottom end of the mesh enclosure, such that sinking morts pass through a first passage from the enclosed volume into the mortality trap. The receiver portion includes a tubular wall and a transverse panel that slopes downwardly from a first side of the tubular wall toward an opposite side, and defines a second passage between the transverse panel and the tubular wall. The mortality trap further includes an entrapment portion disposed below the receiver portion, and having a floor with a first section that slopes downwardly from the opposite side of the tubular wall to a position below the transverse panel, and a second section that extends away from the first section. The mortality trap is configured such that a negatively buoyant mort sinking through the fish pen will pass through the first passage into the receiver portion of the mortality trap, and continue through the second passage and to a location under the transverse panel, such that if the mort becomes positively buoyant, the transverse panel will prevent the mort from re-entering the enclosed volume of the fish pen.

In an embodiment the entrapment portion further comprises a transparent view port configured to provide viewing into the entrapment portion.

In an embodiment the mortality trap further comprises an openable access panel providing access through the tubular wall into the mortality trap.

In an embodiment the entrapment portion defines a converging channel, and a coupling for engagement with an extraction hose is provided that engages the converging channel. In some embodiments the channel converges vertically and horizontally, and a coupling is closeable. In some embodiments a flow port is provided opposite the coupling, and configured to permit a user to initiate a flow from the flow port to the coupling.

In an embodiment the fish pen further includes at least one rim assembly disposed around the spar buoy and one or more attachment members that attach the at least one rim assembly to the spar buoy.

In an embodiment the mortality trap defines a vertical channel that is sized to receive the lower end portion of the spar buoy, and the mortality trap is located at an intermediate location on the lower end portion of the spar buoy.

In an embodiment a lower ring member having an inner diameter that is greater than a diameter of the lower end portion of the spar buoy is attached to the spar buoy with a plurality of attachment brackets, and the mortality trap is fixed to the ring member. For example, the first passage may be defined by the annular gap between the lower ring member and the spar buoy.

A mortality trap for entrapping deceased fish (morts) is configured to be attached to a lower portion of a spar buoy for a fish pen having a mesh enclosure having a bottom end. The mortality trap includes a receiver portion that engages the bottom end of the mesh enclosure to define a first passage from the enclosed volume into the mortality trap, the receiver portion having a tubular wall and a transverse panel that slopes downwardly from a first side of the tubular wall toward an opposite side of the tubular wall, wherein a second passage is defined between the transverse panel and the tubular wall. The mortality trap further includes an entrapment portion extending below the receiver portion, the entrapment portion comprising a floor having a first section that slopes downwardly from the opposite side of the tubular wall to a position below the transverse panel, and a second section that extends from the first section. The mortality trap is configured such that a negatively buoyant mort passing through the first passage into the receiver portion of the mortality trap will continue through the second passage to a location under the transverse panel.

In an embodiment the entrapment portion further comprises a transparent view port configured to provide viewing into the entrapment portion.

In an embodiment the mortality trap further comprises an openable access panel providing access through the tubular wall into the mortality trap.

In an embodiment the entrapment portion defines a converging channel and further comprising a coupling that engages the converging channel and that is configured to couple to an extraction hose. In an embodiment a closeable valve is attached to the converging channel to provide a flow path from the converging channel.

In an embodiment a flow port is positioned opposite the coupling port, and configured to permit a user to initiate a flow from the flow port to the coupling.

In an embodiment the mortality trap defines a vertical channel that is sized to receive the lower portion of the spar buoy, and wherein the mortality trap is disposed at an intermediate location on the lower portion of the spar buoy.

In an embodiment the mortality trap is attached to the spar buoy with a lower ring member having an inner diameter that is greater than a diameter of the lower end portion of the spar buoy, and a plurality of attachment brackets that extend from the ring member to the lower portion of the spar buoy to the ring member, to attach the ring member to the spar buoy, and the mortality trap is fixed to the ring member.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1A is a front view of an open-ocean fish pen with a mortality trap in accordance with the present invention;

FIG. 1B is a plan view of the fish pen shown in FIG. 1A;

FIG. 2B is a detail back view of a lower end of the fish pen, showing further details of the mortality trap shown in FIG. 1A;

FIG. 3 is a detail sectional view through a vertical mid-plane of the mortality trap shown in FIG. 2A;

FIG. 5 is a detail front view of a lower end of the fish pen with the mortality trap shown in FIG. 4.

DETAILED DESCRIPTION

Figure 2A:
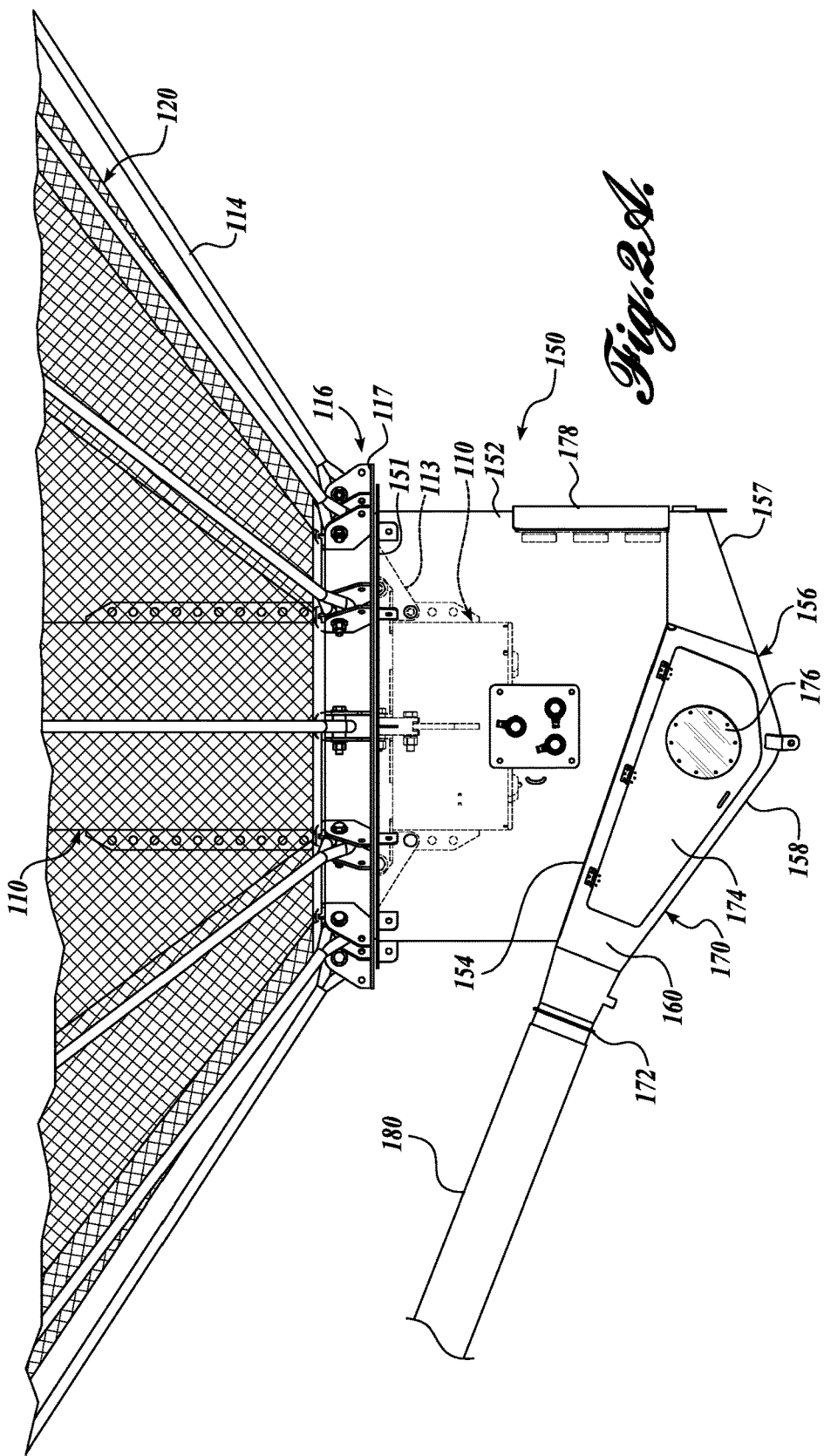
FIG. 2A is a detail front view of a lower end of the fish pen, showing details of the mortality trap shown in FIG. 1A.

When fish in a commercial open-ocean fish pen die (or become debilitatingly ill), the deceased fish (referred to in the art as "morts") initially have a negative buoyancy and sink to a bottom end of the fish pen. After a brief time the mort may become neutrally buoyant and then positively buoyant, due to gasses generated therein, causing the mort to rise through the fish pen. The mort may therefore remain in the fish pen for an extended period of time. Morts in a large fish pen may be very difficult to identify, isolate, and retrieve from the fish pen. In prior art ocean farming operations, divers may be tasked with removing morts.

There are benefits to quickly isolating morts. By identifying and retrieving morts more quickly, the cause of death can be timely determined, and appropriate corrective measures implemented to prevent or reduce the loss of additional fish. For example, if a mort is found to be inflicted with a pathogen for which a protective treatment is available, early administration of the treatment will optimally protect the remaining fish population. If the cause of death is determined to be related to food or other product provided to the pen, then corrective measures may be timely implemented. In addition, minimizing the time that the mort is among the healthy fish population will slow or prevent the spread of pathogen(s) in the population.

Even if a natural, non-pathogenic cause of death is responsible, it would be advantageous to remove the mort from the population for general health maintenance of the fish pen and to avoid undesirably attracting predators to the area of the fish pen.

FIG. 1A shows a front view of a vertical spar fish pen 100 having a central spar buoy 110 supporting an enclosure defined by netting assembly 120, and suitable for use in open-ocean fish farming, for example. A mortality trap 150 in accordance with the present invention is attached at a lower end of the spar buoy 110. FIG. 1B shows a plan view of the fish pen 100. An exemplary vertical spar fish pen is disclosed in U.S. Pat. No. 9,072,282, to Madsen et al., and is incorporated by reference herein.

The mortality trap 150 is configured to receive and isolate morts from the remaining fish population in the fish pen 100. The mortality trap 150 in this embodiment may also be configured to facilitate the harvesting or extraction of healthy live fish from the fish pen 100. Although the mortality trap 150 is shown for attachment with a vertical spar fish pen 100, it is contemplated that the mortality trap 150 may be configured to work with other open-ocean fish pens, for example with spherical or polyhedral fish pens having sloping walls defining a lower end of the confinement volume.

The fish pen 100 includes an elongate centrally located spar buoy 110. The spar buoy 110 is oriented vertically in the body of water. In an exemplary embodiment the spar buoy 110 includes one or more interior spaces that can be selectively filled with water or with air (or another gas), to adjust the buoyancy of the fish pen 100. In some embodiments it may be desirable to raise the fish pen 100 at least partially out of the water, for example to facilitate fish pen cleaning, inspection, maintenance, upgrade, or repair. In a current embodiment, the fish pen 100 is configured with, or configured to engage, an air pumping assembly (not shown) such that air may be pumped into chambers in the spar buoy 110, displacing sea water and thereby increasing the buoyancy of the spar buoy 110. The spar buoy 110 may therefore raise the fish pen 100 partially out of the water. The spar buoy 110 may be connected to an anchor or ballast member (not shown) to maintain the vertical orientation of the spar buoy 110. In some embodiments the spar buoy 110 may be configured to allow the user to flip the fish pen 100 to selectively raise either end of the fish pen 100 out of the water. It will also be appreciated by persons of skill in the art that raising the fish pen 100 may also be beneficial when harvesting fish from the fish pen 100, for example, to crowd the fish into a smaller volume within the fish pen 100.

A rim assembly 112 is disposed around the spar buoy 110. The rim assembly 112 in the exemplary embodiment is formed from a plurality of tubular segments assembled into a polygonal or circular configuration. The rim assembly 112 in the embodiment of FIGS. 1A, 1B is disposed generally perpendicular to the spar buoy 110, and is generally in the shape of a regular dodecagon. In some embodiments the buoyancy of the rim assembly 112 is adjustable. For example, the rim assembly 112 in cooperation with the spar buoy 110 may be configured to be filled with air, water, or a combination of air and water, to produce a desired fish pen 100 buoyancy, or to reorient or invert the fish pen 100, e.g., by asymmetrically changing the buoyancy of the rim assembly 112.

The rim assembly 112 is attached to the spar buoy 110 with a plurality of tension members 114 that extend between a lower spokeline ring 116 and an upper spokeline ring 118. The rim assembly 112 includes a plurality of spaced-apart guides, pulleys, or flanges 119 that are configured to engage respective tension members 114. The flanges 119 provide attachment or engagement points for the tension members 114, and may also be used to anchor the fish pen 100, and/or to gang or interconnect a plurality of fish pens 100.

In some embodiments, the fish pen may comprise more than one rim assembly 112. For example the fish pen may have two or more parallel and spaced-apart rim assemblies 112.

The upper spokeline ring 118 is connected near an upper end of the spar buoy 110. In the current embodiment, the upper spokeline ring 118 is attached to the spar buoy 110 through a plurality of longitudinal rails 111 fixed to, or co-formed with, an outer surface of the spar buoy 110. The rails 111 preferably include a plurality of spaced attachment positions such that the axial location of the upper spokeline ring 118 is adjustable.

Refer also to FIGS. 2A and 3. The lower spokeline ring 116 is connected near a lower end of the spar buoy 110, for example through longitudinal rails 111 fixed to, or co-formed with, an outer surface of the spar buoy 110. In this embodiment, the lower spokeline ring 116 has an inner diameter that is spaced away from the outer diameter of the spar buoy 110 such that an annular channel 90 is defined between the lower spokeline ring 116 and the spar buoy 110, providing access from the volume 105 enclosed by the netting assembly 120 into the mortality trap 150. Attachment brackets 113 extend radially from the lower spokeline ring 116 to connect the lower spokeline ring 116 to the longitudinal rails 111.

In this exemplary embodiment a first plurality of the tension members 114 extend from the upper spokeline ring 118, to a respective one of the flanges 119, and a second plurality of the tension members 114 extend from the respective one of the flanges 119 to the lower spokeline ring 116. For example, each tension member 114 may comprise a cable with attachment members on opposite ends, or may be formed from a plurality of interconnected cables. The tension members 114 engage and support the netting or mesh assembly 120 to define the primary volume 105 enclosed by fish pen 100.

In an alternative embodiment a plurality of tension members 114 extend from the upper spokeline ring 118, and engage guides or channel members, for example rotatably-mounted channel members (not shown) on the ring assembly 112, and further extend downwardly to engage the lower spokeline ring 116.

FIG. 2A shows a front view of the lower end of the fish pen 100, including the mortality trap 150, and FIG. 2B illustrating a back view of the lower end of the fish pen 100. FIG. 3 shows a cross-sectional view of the mortality trap 150, illustrating interior features of the mortality trap 150.

The mortality trap 150 includes an upper receiver portion 150U that is configured to receive sinking morts M from the fish pen 100, and a lower entrapment portion 150L that retains the received morts M in the trap 150 until they can be removed by the user. The upper receiver portion 150U includes a tubular outer wall 152 with an upper flange 151 that is configured to engage a corresponding flange 117 on the lower spokeline ring 116, for attaching the mortality trap 150 to the lower spokeline ring 116. As discussed above, the lower spokeline ring 116 is attached to the spar buoy 110 with a plurality of attachment brackets 113 that extend radially between the spar buoy 110 and the lower spokeline ring 116, defining the annular channel 90 from the fish pen 100 into the mortality trap 150. Other suitable attachment mechanisms as are well-known in the art may alternatively be used.

As seen most clearly in FIG. 3, the lower entrapment portion 150L of the mortality trap 150 includes a sloped interior panel 154 that extends transversely from a first side of the outer wall 152, and only part way to the opposite side of the mortality trap 150 such that an opening or passageway 155 (and arrow B) is defined between the sloped interior panel 154 and the opposite side of the outer wall 152. The trap 100 includes a shaped floor 156 having a first section 157 underlying the passageway 155 that is sloped in an opposite direction from the sloped interior panel 154 and extends from the opposite side of the outer wall 152 toward the first side of the outer wall 152, extending under the passageway 155 and under a portion of the sloped interior panel 154. A second section 158 of the floor 156 slopes from the first portion, converging toward the sloped interior panel 154. The floor 156 defines a settling area SA beneath the sloped interior panel 154.

A pair of oppositely-disposed side walls 160 extend between the sloped interior panel 154 and the floor portion 156 to cooperatively define a converging channel 170. In this embodiment the converging channel 170 converges in the vertical direction (between the sloped interior panel 154 and the second section 158 of the floor 156) and in the horizontal direction (between the converging side walls 160). The converging channel 170 connects to a coupling 172 that is configured to engage an extraction hose 180. In an embodiment the coupling 172 comprises a closeable valve. Although in this embodiment the extraction hose 180 is located outside of the volume 105 enclosed by the netting assembly 120, in another embodiment the extraction hose 180 extends upwardly through the fish pen 100. For example, the extraction hose 180 may be located adjacent or parallel to the spar buoy 110. It is contemplated that at least a portion of the extraction hose may be located internally in the spar buoy 110.

A flow port 159 is optionally provided opposite the converging channel 170. The flow port 159 is configured to be connected to a pump or other flow device (not shown), to provide a flow through the converging channel 170 and into the extraction hose 180. Optionally, the mortality trap 150 includes an openable access panel 178 that provides access to the upper portion of the mortality trap 150, for example, to facilitate cleaning and maintenance. The converging channel 170 may also include one or more access panels 174, to provide workers access to the interior of the trap 150.

The mortality trap 150 optionally also includes one or more view ports 176. For example, the view ports 176 may facilitate video monitoring of the mortality trap 150 to provide early detection of potential problems. Optionally, one or more visual barriers 182 (see FIG. 3) are located to deter healthy fish from entering the settling area SA of the mortality trap 150, without hindering morts M from passing therethrough. In this embodiment the visual barrier 182 comprises a slitted sheet or plurality of strips of a weighted material that hangs down near the end of the sloped interior panel 154. Other options and positioning of the visual barrier are contemplated. For example a transverse barrier may extend from the opposite side of the trap toward the sloped interior panel 154, to define a narrow entry to the floor 156 of the trap.

The operation of the mortality trap 150 can now be understood, with reference to FIG. 3. As discussed above, typically when a fish perishes, it typically will have a negatively buoyancy and will sink toward the bottom of the fish pen 100. The conical walls of the netting assembly 120 guide the mort M toward the mortality trap 150. As the mort M sinks it passes from the fish pen 100, through the annular channel 90, into the mortality trap 150. The mort M initially encounters the sloped interior panel 154 and slides along the sloped interior panel 154 toward the opening 155 between the sloped interior panel 154 and the outer wall 152, as indicated by arrow A. At the end of the sloped interior panel 154 the mort M passes through the opening 155 onto the sloped portion 157 of the floor 156, as indicated by arrow B. The mort M will continue along the first portion 157 toward the settling area SA, as indicated by arrow C. It will be appreciated that if the mort M becomes positively buoyant, the mort M will engage the sloped interior panel 154 and slide further into the converging channel 170, preventing the mort M from returning to the fish pen 100.

Periodically or in response to one or more morts M being detected in the converging channel 170, the coupling 172 may be opened to provide a flow path to the extraction hose 180, and a flow initiated to extract the mort M, for example by connecting a pump to port 159, and operating the pump to initiate the flow.

It is further contemplated that the mortality trap 150 may be used for harvesting operations, to remove live fish from the fish pen 100. For example, a crowding mechanism may be used to urge live fish through the annular channel 90 into the mortality trap 150, and into a flow through the converging channel 170 and into the extraction hose 180.

Figure 4:
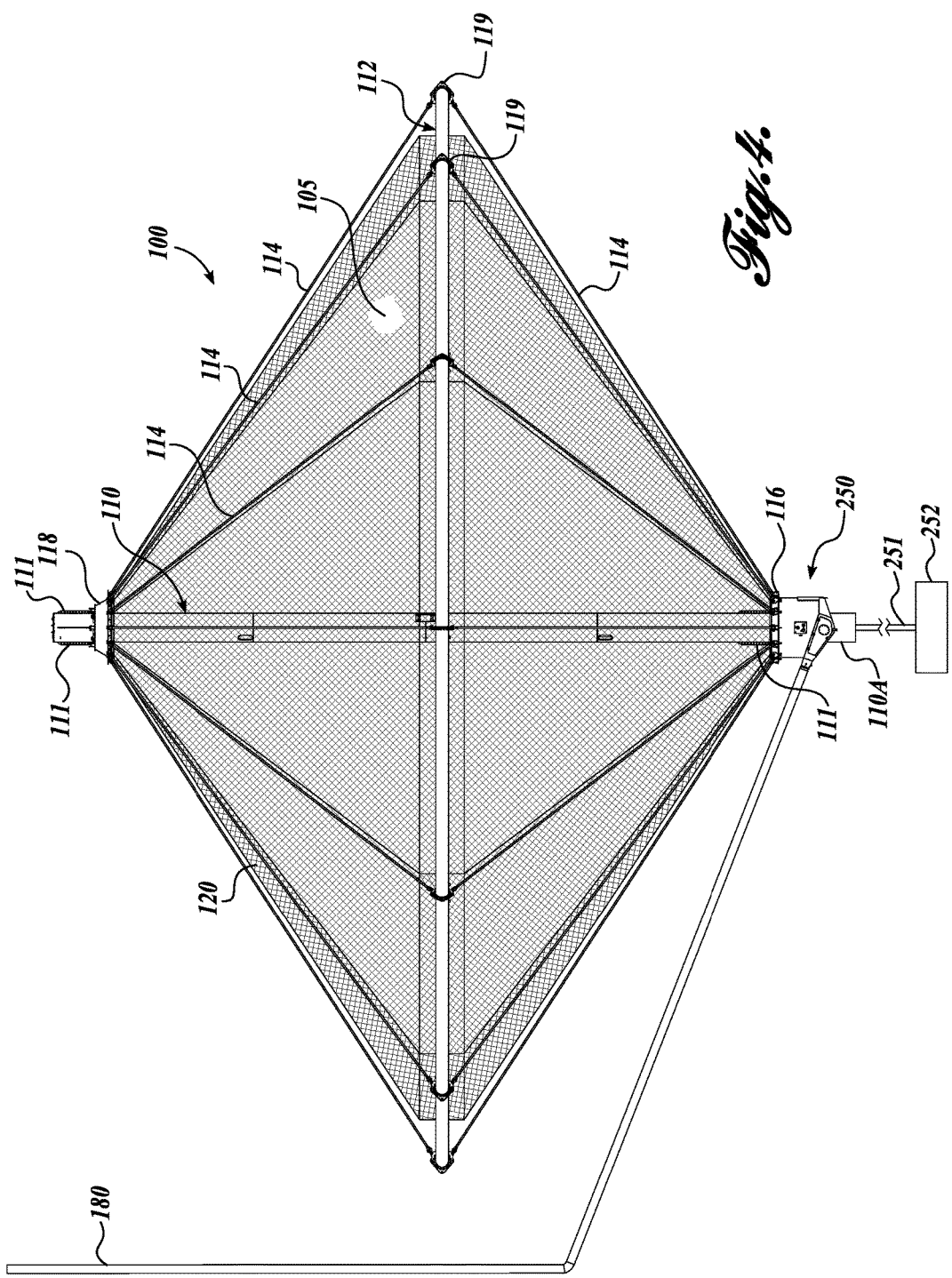
FIG. 4 is a front view of another embodiment of a fish pen with a mortality trap, in accordance with the present invention, wherein the mortality trap has a vertical through-channel sized to receive the spar buoy therethrough, and is located above the bottom end of the spar buoy.

Another embodiment of a mortality trap 250 in accordance with the present invention is shown in FIGS. 4 and 5, and shares many features with the mortality trap 150 described above. Aspects of this embodiment of the mortality trap 250 that are similar to the mortality trap 150 described above will not be repeated, for clarity and brevity. In this embodiment the mortality trap 250 includes a through-channel vertically through the trap 250 that is sized to receive the spar buoy. The spar buoy 110 extends completely through the mortality trap 250, such that the mortality trap 250 is located at an intermediate location along the lower end portion of the spar buoy 110 (below the mesh enclosure 120).

FIG. 4 shows a front view of the fish pen 100 with the mortality trap 250 located near a lower end of the spar buoy 110, with a lower portion 110A of the spar buoy 110 extending below the mortality trap 250. A ballast member 252 is optionally attached to the lower portion 110A of the spar buoy 110 with one or more attachment members, for example cable 251. In some embodiments the cable 251 is connected to a reel and drive assembly (not shown) such that the effective length of the cable 251 may be adjusted, for example to change the depth of the fish pen 100 in the body of water. For example, the cable 251 may be lengthened (reeled out) to allow the fish pen 100 to be raised to facilitate maintenance, or to treat or harvest fish within the fish pen 100. In another example, the length of the cable 251 may be controlled to change the position of the fish pen 100 relative to the sea floor, for example to follow tidal changes, or the like.

The ballast member 252 is configured to stabilize the spar buoy 110 such that the spar buoy 110 and the fish pen 100 are maintained in a desired vertical orientation. In some embodiments the ballast member 252 may rest on the sea floor during use, and anchor the fish pen 100 in a desired location. In some embodiments the ballast member may comprise a plurality of separate weighted members. In some embodiments one or more separate lines and anchors or piles (not shown) anchor the ballast member 252 to the sea floor at a desired location. In a fish farm having a plurality of fish pens 100 with ballast members 252, the ballast members 252 may be interconnected, and anchored to maintain the fish pens 100 in a desired configuration.

In this embodiment the mortality trap 250 including the lower spokeline ring 116 engage the spar buoy 110 at an intermediate location on the spar buoy 110, and the spar buoy 110 extends completely through the length of the mortality trap 250. The mortality trap 250 is therefore protected from potentially damaging impacts with the sea floor by the spar buoy 110, and the lower end of the spar buoy 110 is more readily available for attachment of an anchor or ballast member 252. It will be appreciated that the spar buoy 100 in this embodiment extends through the sloped interior panel 154 and through the floor 156. The settling area SA between the sloped interior panel 154 and the floor is generally annular, with a width configured to receive and accommodate morts.

While illustrative embodiments have been illustrated and described, it will be appreciated that various changes can be made therein without departing from the spirit and scope of the invention.

The embodiments of the invention in which an exclusive property or privilege is claimed are defined as follows:

1. A fish pen comprising:

a spar buoy having an upper end portion and a lower end portion;

a mesh enclosure having a top end attached to the upper end portion of the spar buoy, and a bottom end attached to the lower end portion of the spar buoy, wherein the mesh enclosure defines an enclosure volume;

a mortality trap attached to the lower end portion of the spar buoy, the mortality trap comprising:

a receiver portion that engages the bottom end of the mesh enclosure to define a first passage from the enclosed volume into the mortality trap, the receiver portion having a tubular wall and a transverse panel that slopes downwardly from a first side of the tubular wall toward an opposite side of the tubular wall, wherein a second passage is defined between the transverse panel and the tubular wall; and an entrapment portion disposed below the receiver portion, the entrapment portion comprising a floor having a first section that slopes downwardly from the opposite side of the tubular wall to a position below the transverse panel, and a second section that extends from the first section;

wherein a negatively buoyant mort sinking through the fish pen will pass through the first passage into the receiver portion of the mortality trap and continue through the second passage to a location under the transverse panel.

2. The fish pen of claim 1, wherein the entrapment portion further comprises a transparent view port configured to provide viewing into the entrapment portion.

3. The fish pen of claim 1, wherein the mortality trap further comprises an openable access panel providing access through the tubular wall into the mortality trap.

4. The fish pen of claim 1, wherein the entrapment portion defines a converging channel and further comprising a coupling that engages the converging channel and that is configured to couple to an extraction hose.

5. The fish pen of claim 4, wherein the converging channel converges vertically and horizontally.

6. The fish pen of claim 4, wherein the coupling comprises a closeable valve.

7. The fish pen of claim 4, further comprising a flow port positioned opposite the coupling port, wherein the flow port is configured to permit a user to initiate a flow from the flow port to the coupling.

8. The fish pen of claim 1, further comprising at least one rim assembly disposed around the spar buoy and one or more attachment members that attach the at least one rim assembly to the spar buoy.

9. The fish pen of claim 1, wherein the mortality trap defines a vertical channel therethrough that is sized to receive the lower end portion of the spar buoy, and where the mortality trap is disposed at an intermediate location on the lower end portion of the spar buoy.

10. The fish pen of claim 1, further comprising a lower ring member having an inner diameter that is greater than a diameter of the lower end portion of the spar buoy and a plurality of attachment brackets that attach the ring member to the spar buoy, wherein the mortality trap is fixed to the ring member.

11. The fish pen of claim 10, wherein the first passage into the receiver portion of the mortality trap comprises an annular gap between the lower ring member and the lower end portion of the spar buoy.

12. A mortality trap for entrapping deceased fish (morts) and configured to be attached to a lower portion of a spar buoy for a fish pen having a mesh enclosure having a bottom end, the mortality trap comprising:

a receiver portion that engages the bottom end of the mesh enclosure to define a first passage from the enclosed volume into the mortality trap, the receiver portion having a tubular wall and a transverse panel that slopes downwardly from a first side of the tubular wall toward an opposite side of the tubular wall, wherein a second passage is defined between the transverse panel and the tubular wall; and an entrapment portion disposed below the receiver portion, the entrapment portion comprising a floor having a first section that slopes downwardly from the opposite side of the tubular wall to a position below the transverse panel, and a second section that extends from the first section;

wherein a negatively buoyant mort passing through the first passage into the receiver portion of the mortality trap will continue through the second passage to a location under the transverse panel.

13. The mortality trap of claim 12, wherein the entrapment portion further comprises a transparent view port configured to provide viewing into the entrapment portion.

14. The mortality trap of claim 12, wherein the mortality trap further comprises an openable access panel providing access through the tubular wall into the mortality trap.

15. The mortality trap of claim 12, wherein the entrapment portion defines a converging channel and further comprising a coupling that engages the converging channel and that is configured to couple to an extraction hose.

16. The mortality trap of claim 15, wherein the converging channel converges vertically and horizontally.

17. The mortality trap of claim 16, wherein a coupling comprising a closeable valve is attached to the converging channel to provide a flow path from the converging channel.

18. The mortality trap of claim 17, further comprising a flow port positioned opposite the coupling port, wherein the flow port is configured to permit a user to initiate a flow from the flow port to the coupling.

19. The mortality trap of claim 12, wherein the mortality trap defines a vertical channel that is sized to receive the lower portion of the spar buoy, and wherein the mortality trap is disposed at an intermediate location on the lower portion of the spar buoy.

20. The mortality trap of claim 12, wherein the mortality trap is attached to the spar buoy with a lower ring member having an inner diameter that is greater than a diameter of the lower end portion of the spar buoy, and a plurality of attachment brackets that extend from the ring member to the lower portion of the spar buoy to the ring member to attach the ring member to the spar buoy, and the mortality trap is fixed to the ring member.

\* \* \* \* \*